(12) United States Patent
Matsushita et al.

(10) Patent No.: US 11,908,633 B2
(45) Date of Patent: Feb. 20, 2024

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Shumpei Matsushita, Yamaguchi (JP); Tomoyuki Tashiro, Yamaguchi (JP); Kenta Chashiro, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 20 days.

(21) Appl. No.: 17/540,762

(22) Filed: Dec. 2, 2021

(65) Prior Publication Data
US 2022/0093342 A1 Mar. 24, 2022

Related U.S. Application Data

(63) Continuation of application No. PCT/JP2020/024751, filed on Jun. 24, 2020.

(30) Foreign Application Priority Data

Jun. 28, 2019 (JP) ................................ 2019-122188

(51) Int. Cl.
*H01G 9/048* (2006.01)
*H01G 9/00* (2006.01)
(Continued)

(52) U.S. Cl.
CPC ........... *H01G 9/048* (2013.01); *H01G 9/0032* (2013.01); *H01G 9/08* (2013.01); *H01G 9/145* (2013.01); *H01G 9/008* (2013.01)

(58) Field of Classification Search
CPC ............................... H01G 9/012; H01G 9/008
See application file for complete search history.

(56) References Cited

U.S. PATENT DOCUMENTS 6,310,756 B1 * 10/2001 Miura ..................... H01G 9/08
361/301.3
2002/0191370 A1 12/2002 Matsuoka et al.
(Continued)

FOREIGN PATENT DOCUMENTS

JP 54-090653 U 6/1979
JP 8-288182 11/1996
(Continued)

OTHER PUBLICATIONS

International Search Report of PCT application No. PCT/JP2020/024751 dated Sep. 15, 2020.

*Primary Examiner* — Eric W Thomas
(74) *Attorney, Agent, or Firm* — Rimon P.C.

(57) ABSTRACT

An electrolytic capacitor includes a capacitor element, a first current collector, and a case. The capacitor element includes a wound body in which a first electrode foil and a second electrode foil are wound. The first electrode foil and the second electrode foil face each other. The first current collector is connected to the first electrode foil. The case houses the capacitor element and the first current collector. The first electrode foil includes a first facing portion that faces the second electrode foil and a first non-facing portion that does not face the second electrode foil. The first non-facing portion is located at a first end portion in a winding axis of the wound body. The first current collector is disposed in a vicinity of the first end portion of the wound body to be connected to the first non-facing portion of the first electrode foil.

14 Claims, 8 Drawing Sheets

(51) Int. Cl.
*H01G 9/08* (2006.01)
*H01G 9/145* (2006.01)
*H01G 9/008* (2006.01)

(56) References Cited

U.S. PATENT DOCUMENTS

| | | |
|---|---|---|
| 2003/0128500 A1 | 7/2003 | Matsuoka et al. |
| 2006/0245144 A1 | 11/2006 | Hozumi et al. |
| 2018/0047521 A1* | 2/2018 | Tsuda .................... H01G 9/145 |

FOREIGN PATENT DOCUMENTS

| | | |
|---|---|---|
| JP | 2000340210 A * | 12/2000 |
| JP | 2001-068379 | 3/2001 |
| JP | 2002-500824 | 1/2002 |
| JP | 2005-310402 | 11/2005 |
| JP | 2009-141102 | 6/2009 |
| WO | 2005/052967 | 6/2005 |

* cited by examiner

ELECTROLYTIC CAPACITOR AND METHOD FOR MANUFACTURING SAME

BACKGROUND

1. Technical Field

The present disclosure relates to an electrolytic capacitor and a method for manufacturing the same, and more specifically relates to improvement in ESR characteristics of the electrolytic capacitor.

2. Description of the Related Art

Capacitors used in electronic devices are required to have a large capacitance and a small equivalent series resistance (ESR) in a high frequency region. When a wound body obtained by winding electrode foil is used as a capacitor element, electric resistance is likely to increase, and thus the ESR is likely to increase. Japanese Utility Model Laid-Open No. 54-90653 teaches providing a protruding portion on electrode foil and thermally spraying metal on the protruding portion.

SUMMARY

An electrolytic capacitor according to a first aspect of the present disclosure includes a capacitor element, a first current collector, and a case that houses the capacitor element and the first current collector. The capacitor element includes a wound body in which a first electrode foil and a second electrode foil are wound, a first lead terminal connected to the first electrode foil, and a second lead terminal connected to the second electrode foil. The first electrode foil and the second electrode foil face each other. The first current collector is connected to the first electrode foil. The first electrode foil includes a first facing portion that faces the second electrode foil and a first non-facing portion that does not face the second electrode foil. The first non-facing portion is located at a first end portion in a winding axis of the wound body. The first current collector is disposed in a vicinity of the first end portion of the wound body to be connected to the first non-facing portion of the first electrode foil.

A method for manufacturing an electrolytic capacitor according to a second aspect of the present disclosure includes the following steps: a step of preparing a first electrode foil connected to a first lead terminal and a second electrode foil connected a second lead terminal; a step of stacking the first electrode foil and the second electrode foil to oppose to each other so that a first non-facing portion that does not face the second electrode foil is formed in the first electrode foil; a step of winding the first electrode foil and second electrode foil to locate the first non-facing portion at a first end portion in a winding axis to obtain a capacitor element; a connecting step of connecting the first current collector to the first non-facing portion so that the first current collector is located in a vicinity of the first end portion; and a step of housing the capacitor element in a case.

According to the present disclosure, an electrolytic capacitor with reduced ESR can be obtained.

DETAILED DESCRIPTION OF EMBODIMENT

Figure 1:
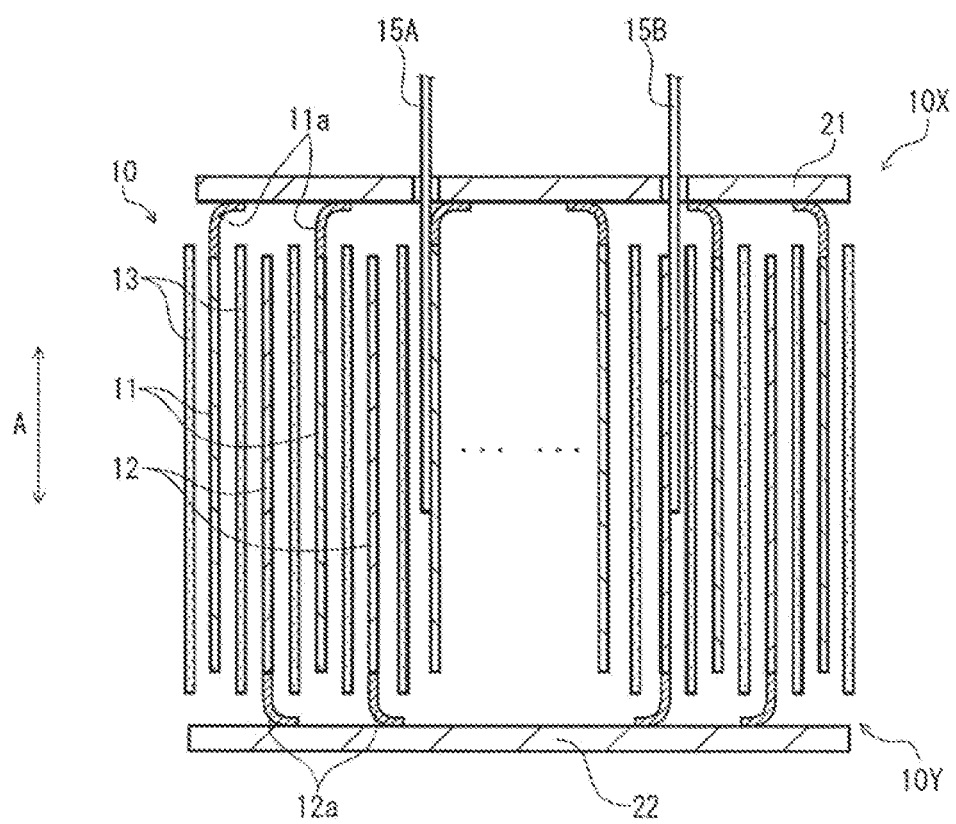
FIG. 1 is a sectional view schematically illustrating a main part of a capacitor element according to an exemplary embodiment of the present disclosure.

The method disclosed in Japanese Utility Model Laid-Open No. 54-90653 does not sufficiently reduce ESR.

When a wound body obtained by winding electrode foil being an elongated body is used as a capacitor element, a moving distance of electrons is likely to increase. Thus, the present exemplary embodiment includes a current collector other than a lead terminal, which is disposed at an end portion of the capacitor element, so that the current collector collects current from the electrode foil. By connecting the electrode foil with the current collector disposed on the end portion to collect the current, a moving distance of electrical charges from the electrode foil, which is wound, at an outer peripheral side or an inner peripheral side to the lead terminal can be shortened in the electrode foil. This suppresses increase in ESR by reducing electric resistance in the capacitor element. Thus, even when a large ripple current flows through the electrolytic capacitor, heat generation is reduced.

Thermal spraying is a method of spraying particles of molten metal onto an object. When metal is thermally sprayed onto electrode foil as disclosed in Japanese Utility Model Laid-Open No. 54-90653, thin electrode foil may be displaced from a predetermined position due to wind pressure, or metal particles may enter the inside of the wound body, thereby causing a short circuit. Although it is possible to prevent a short circuit by increasing a region where electrode foils different in polarity do not face each other, this increases cost of the electrolytic capacitor as well as a region that does not contribute to capacitance.

[Electrolytic Capacitor]

An electrolytic capacitor according to the present exemplary embodiment includes: a capacitor element including a wound body in which a first electrode foil and a second electrode foil are wound, a first lead terminal connected to the first electrode foil, and a second lead terminal connected to the second electrode foil; a first current collector connected to the first electrode foil; and a case that houses the capacitor element and the first current collector.

The first electrode foil includes a first facing portion that faces the second electrode foil, and a first non-facing portion that is located at a first end portion in a winding axis of the wound body and does not face the second electrode foil. In other words, the first non-facing portion protrudes at a first end portion side of the wound body. The first current collector is disposed at a side close to the first end portion, and is connected to the first non-facing portion in the first electrode foil. The first end portion is an end face of the wound body, which has a substantially circular shape, viewed in a direction along the winding axis.

The electrolytic capacitor may include a second current collector connected to the second electrode foil. The second electrode foil includes a second facing portion that faces the first electrode foil, and a second non-facing portion that is located at a second end portion opposite to the first end portion and does not face the first electrode foil. In other words, the second non-facing portion protrudes at a second end portion side of the wound body. The second current collector is disposed at a side close to the second end portion, and is connected to the second non-facing portion in the second electrode foil.

(Capacitor Element)

The capacitor element includes the wound body in which the first electrode foil and the second electrode foil are wound, the first lead terminal connected to the first electrode foil, and the second lead terminal connected to the second electrode foil.

The first electrode foil may be anode foil. The first electrode foil may be cathode foil. In particular, the first electrode foil is preferably cathode foil from the viewpoint of easily enhancing an effect of reducing ESR.

The second electrode foil has a polarity opposite to that of the first electrode foil. When the first electrode foil is cathode foil, the second electrode foil is anode foil. From the viewpoint of enhancing an effect of reducing the ESR more easily, a current collector each connected to the anode foil and the cathode foil is preferably provided.

(Anode Foil)

The anode foil is metal foil containing at least one valve metal such as titanium, tantalum, aluminum, or niobium. The anode foil may contain the valve metal in a form such as an alloy containing the valve metal or a compound containing the valve metal. The anode foil has a thickness that is not particularly limited, and has a thickness within a range, for example, from 15 μm to 300 μm, inclusive. The thickness is an average value measured at any five points (the same applies hereinafter). The anode foil has a surface that may be roughened by etching or the like.

On the surface of the anode foil, a dielectric layer is formed. The dielectric layer is formed, for example, by subjecting the anode foil to anodizing treatment. This case enables the dielectric layer to contain an oxide of the valve metal. The dielectric layer is not limited to this, and may be any one that functions as a dielectric.

(Cathode Foil)

The cathode foil is not particularly limited as long as functioning as a cathode. The cathode foil may be metal foil. The metal is not particularly limited in a type, and may be a valve metal or an alloy containing a valve metal as with the anode foil, or may be iron (Fe), copper (Cu), or the like other than the valve metal. The cathode foil is not limited in thickness, and has a thickness within a range, for example, from 15 μm to 300 μm, inclusive. The cathode foil has a surface that may be roughened or subjected to anodizing treatment as necessary. On the surface of the cathode foil, an inorganic layer containing carbon, nickel, titanium, and an oxide or nitride thereof, may be formed.

(First Current Collector)

The first current collector is, for example, a metal plate or metal foil. Although the metal is not particularly limited in a type, it is preferable that the first current collector includes the same metal as the first electrode foil to be connected. For example, when the first electrode foil is anode foil, the first current collector is preferably a metal plate or metal foil containing at least one valve metal. When the first electrode foil is cathode foil, the first current collector may or may not contain a valve metal.

The first current collector is not particularly limited in shape. From the viewpoint of space saving, the first current collector is preferably a plate-like member for covering at least a part of the first end portion of the wound body. In particular, the first current collector preferably has a shape that mutually connects a plurality of portions in the first non-facing portion, which are located at different distances from the center of the wound body. Since the first current collector connects the first non-facing portion in a radial direction of the wound body, a moving distance of electrical charges from the portions near an outer periphery of the wound body to the first lead terminal is further reduced.

Typically, considering the moving distance of each of electrical charges from the outermost circumference and the innermost circumference of the electrode foil, a connection position of the lead terminal on the electrode foil is set near the center in the direction (winding direction) intersecting the winding axis of the electrode foil. When the first current collector connects the first non-facing portions in the radial direction of the wound body as in the present exemplary embodiment, the moving distance of the electrical charges from the outermost circumference or the innermost circumference is shortened. Thus, the connection position of the lead terminal is less likely to be restricted, so that a degree of freedom in design is improved.

From the viewpoint of facilitating improvement in current collectability of electrical charges in the outermost periphery of the first electrode foil, the first current collector is preferably configured to cover at least a part of a region including at least a part of a first straight line. The first straight line is drawn in the radial direction of the first end portion from the center of the first lead terminal toward an outer edge of the first end portion when viewed in the normal direction of the first end portion. Since the first current collector connects a portion near the outermost periphery of the first non-facing portion to a portion near a portion connected to the first lead terminal of the first non-facing portion, a moving distance of electrical charges from the outermost periphery of the first electrode foil to the first lead terminal is shortened.

Examples of a shape of the first current collector described above include a disk shape having a diameter substantially equal to that of the first end portion, a ring shape having an outer diameter substantially equal to that of the first end portion and an inner diameter equal to or larger than a distance from the center of the first end portion to the first lead terminal, a rectangular shape including the first straight line, and a combination of the ring shape and the rectangular shape.

From the viewpoint of facilitating improvement in current collectability of electrical charges in the innermost periphery of the first electrode foil, the first current collector is preferably configured to cover a region including at least a part of a second straight line. The second straight line is drawn from the center of the first end portion to the center of the first lead terminal when viewed in the normal direction of the first end portion. Since the first current collector connects a portion near the innermost periphery of the first non-facing portion to a portion near a portion connected to the first lead terminal of the first non-facing portion, a moving distance of electrical charges from the innermost periphery of the first electrode foil to the first lead terminal is shortened.

Examples of a shape of the first current collector described above include a disk shape having a diameter substantially equal to the distance from the center of the first end portion to the first lead terminal, and a rectangular shape including the second straight line.

From the viewpoint of facilitating improvement in current collectability of electrical charges in both the outermost periphery and the innermost periphery of the first electrode foil, the first current collector may have a shape such as: a disk shape having a diameter substantially equal to that of the first end portion; a rectangular shape including at least a part of a straight line drawn from the center of the first end portion to an outer edge of the first end portion, preferably through the center of the first lead terminal; a combination of a plurality of the rectangular shapes; or a combination of the rectangular shape and a ring shape having an outer diameter substantially equal to the diameter of the first end portion and an inner diameter equal to or larger than the distance from the center of the first end portion to the first lead terminal.

The first current collector may have an opening through which at least one of the first lead terminal and the second lead terminal is inserted. The first current collector may have at least one of a plurality of through-holes and notches. This allows the wound body to be easily impregnated with an electrolytic solution and/or a conductive polymer dispersion liquid. Examples of the first current collector having a plurality of through-holes include a metal porous body, a metal mesh, a punching metal, and an expanded metal. The first current collector has a thickness that is not particularly limited, and has a thickness within a range, for example, from 15 μm to 300 μm, inclusive.

On the surface of the first current collector, a dielectric layer is preferably formed. This causes corrosion of the first current collector to be easily suppressed.

A conductive polymer may be attached to the first current collector. The conductive polymer is interposed between the first electrode foil and the second electrode foil, for example, as a solid electrolyte of the electrolytic capacitor. Since the conductive polymer is also attached to the first current collector, electrical conductivity between the first current collector and the electrode foil is enhanced, and thus reduction of ESR can be further expected.

(First Lead Terminal)

The first lead terminal is made of material that is not particularly limited as long as the material is electrochemically and chemically stable, and conductive. Thus, the material may be metal or nonmetal. The first lead terminal is also not limited to a particular shape. The first lead terminal extends from the first end portion or the second end portion of the wound body toward the outside of the wound body.

(Second Current Collector)

The second current collector is similar to the first current collector in shape, material, and the like. The second current collector also preferably mutually connects a plurality of portions in the second non-facing portion, which are located at different distances from the center of the wound body. When viewed in the normal direction of the second end portion, the second current collector is preferably configured to cover at least a region including a straight line that is drawn in a radial direction of the second end portion from the center of the second lead terminal to an outer edge of the second end portion. When viewed in the normal direction of the second end portion, the second current collector is preferably configured to cover at least a region including a straight line that is drawn from the center of the second end portion to the center of the second lead terminal.

The second current collector has a surface on which a dielectric layer may be formed, or a conductive polymer may be attached to the surface.

(Second Lead Terminal)

The second lead terminal is made of a material that is not particularly limited as long as the material is electrochemically and chemically stable, and conductive, as with the first lead terminal. Thus, the material may be metal or nonmetal. The second lead terminal is also not limited to a particular shape. The second lead terminal extends from the wound body at the same side as the first lead terminal extends toward the outside of the wound body.

(Separator)

Between the anode foil and the cathode foil, a separator may be interposed. When a conductive polymer having a sufficient thickness is disposed between the anode foil and the cathode foil, the separator may be eliminated.

The separator is not particularly limited as long as being porous. Examples of the separator include a nonwoven fabric made of cellulose fiber, a nonwoven fabric made of glass fiber, a microporous membrane made of polyolefin, a fabric cloth, and a nonwoven fabric. The separator has a thickness that is not particularly limited, and has a thickness within a range, for example, from 10 μm to 300 μm, inclusive.

(Conductive Polymer)

The conductive polymer functions as a solid electrolyte in the electrolytic capacitor. Examples of the conductive polymer include polypyrrole, polythiophene, polyfuran, polyaniline, polyacetylene, polyphenylene, polyphenylene vinylene, polyacene, and polythiophene vinylene. These may be used alone, two or more types may be used in combination, or a copolymer of two or more types of monomer may be used.

In the present specification, polypyrrole, polythiophene, polyfuran, polyaniline, and the like mean polymers having, as a basic skeleton, polypyrrole, polythiophene, polyfuran, polyaniline, and the like, respectively. Thus, polypyrrole, polythiophene, polyfuran, polyaniline, and the like each may also include its derivative. For example, polythiophene includes poly(3,4-ethylenedioxythiophene) and the like.

The conductive polymer may be included in the electrolytic capacitor together with a dopant. The dopant may be a monomolecular anion or a polymeric anion. Specific examples of the monomolecular anion include p-toluenesulfonic acid and naphthalenesulfonic acid. Specific examples of the polymeric anion include polyvinylsulfonic acid, polystyrenesulfonic acid, polyallylsulfonic acid, polyacrylsulfonic acid, polymethacrylsulfonic acid, poly(2-acrylamido-2-methylprop anesulfonic acid), polyisoprenesulfonic acid, and polyacrylic acid. These may be used alone or in combination of two or more thereof. These also may be a polymer of a single monomer or a copolymer of two or more types of monomer. In particular, a polymer anion derived from polystyrenesulfonic acid is preferable.

(Case)

The case is bottomed and houses the capacitor element, the first current collector, and the second current collector disposed as necessary.

The capacitor element is housed with the first end portion or the second end portion facing a bottom of the bottomed case. At this time, the bottom of the bottomed case and the current collector may be brought into contact with each other. This enhances heat dissipation. When the current collector disposed near the bottom of the bottomed case is connected to the anode foil, the bottom and the current collector are preferably insulated from each other by a separator (electrolytic paper) or the like.

Examples of material of the bottomed case include metal such as aluminum, stainless steel, copper, iron, or brass, and an alloy thereof.

FIG. 1 is a sectional view schematically illustrating a main part of the capacitor element according to the present exemplary embodiment. In FIG. 1, the first electrode foil is anode foil, and the second electrode foil is cathode foil. For convenience, the anode foil, the separator, and the cathode foil are illustrated at intervals. Further, the anode foil, the separator, and the cathode foil near the center are not illustrated. A non-facing portion in each of the electrode foils is hatched.

The capacitor element includes wound body 10 in which anode foil 11 (first electrode foil) and cathode foil 12 (second electrode foil) are wound with separator 13 interposed therebetween, first lead terminal 15A connected to anode foil 11, and second lead terminal 15B connected to cathode foil 12.

Anode foil 11 includes first non-facing portion 11a that does not face cathode foil 12 at first end portion 10X in winding axis A of wound body 10. First current collector 21 is disposed in a vicinity of first end portion 10X. First current collector 21 is a plate-like member configured to cover at least a part of first end portion 10X, and includes an opening through which first lead terminal 15A and second lead terminal 15B are inserted.

First current collector 21 is connected to first non-facing portion 11a in anode foil 11. First current collector 21 connects a plurality of portions of first non-facing portion 11a which are located at different distances from the center of wound body 10. That is, first current collector 21 connects a portion of first non-facing portion 11a disposed at an outer peripheral side and a portion of first non-facing portion 11a disposed at a side inner than the outer peripheral side. Specifically, first current collector 21 connects a portion of first non-facing portion 11a near the outermost periphery and a portion of first non-facing portion 11a near a portion connected to first lead terminal 15A.

Cathode foil 12 includes second non-facing portion 12a that does not face anode foil 11 at second end portion 10Y in winding axis A of wound body 10. Second current collector 22 is disposed in a vicinity of second end portion 10Y. Second current collector 22 is connected to cathode foil 12 in second non-facing portion 12a. Second current collector 22 connects a plurality of portions of second non-facing portion 12a which are located at different distances from the center of wound body 10. That is, second current collector 22 connects a portion of second non-facing portion 12a disposed at an outer peripheral side and a portion of second non-facing portion 12a disposed at a side inner than the outer peripheral side. Specifically, second current collector 22 connects a portion of second non-facing portion 12a near the outermost periphery and a portion of second non-facing portion 12a near a portion connected to second lead terminal 15B.

A dielectric layer (not illustrated) is formed on a surface of each of anode foil 11 and first current collector 21. Further, a conductive polymer (not illustrated) is disposed between anode foil 11 and cathode foil 12, and adheres to a surface of each of first current collector 21 and second current collector 22.

Figure 2:
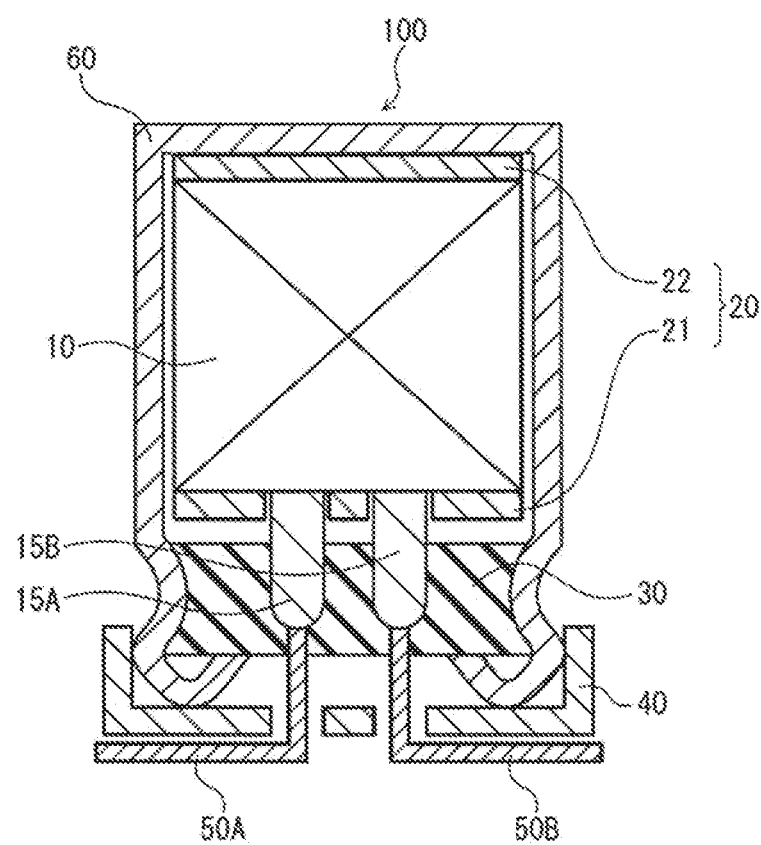
FIG. 2 is a sectional view schematically illustrating an example of the electrolytic capacitor according to the exemplary embodiment of the present disclosure.

FIG. 2 is a sectional view schematically illustrating an example of the electrolytic capacitor according to the present exemplary embodiment. Electrolytic capacitor 100 includes, for example, wound body 10, first lead terminal 15A, second lead terminal 15B, first current collector 21 connected to an anode foil, second current collector 22 connected to a cathode foil, bottomed case 60 housing these members, sealing member 30 sealing an opening of bottomed case 60, base plate 40 covering sealing member 30, and external lead wires 50A, 50B led out from sealing member 30 and penetrating base plate 40.

First lead terminal 15A connects external lead wire 50A and the anode foil. Second lead terminal 15B connects external lead wire 50B and the cathode foil. Second current collector 22 connected to the cathode foil is in contact with a bottom of bottomed case 60. Bottomed case 60 is drawn inward near its opening end, and the opening end is curled to crimp sealing member 30.

FIGS. 3A to 3D are each a top view schematically illustrating an example of the current collector (the first current collector and/or the second current collector) according to the present exemplary embodiment. Each of the current collectors according to FIGS. 3A to 3D is a plate-like member.

Figure 3A:
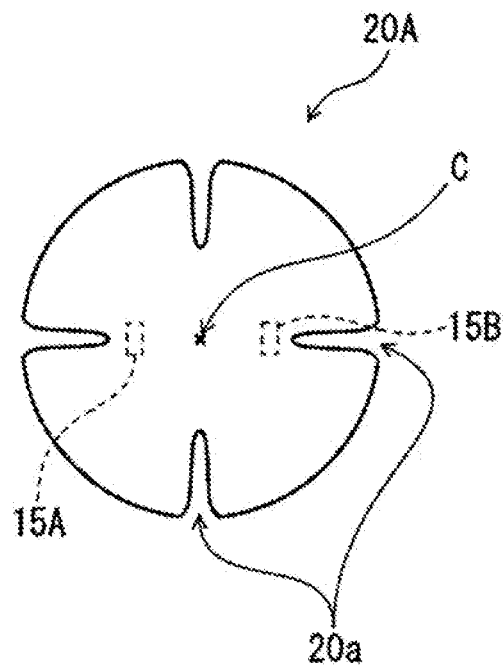
FIG. 3A is a top view schematically illustrating an example of a current collector according to the exemplary embodiment of the present disclosure.

FIG. 3A illustrates current collector 20A that is in a disk shape covering the entire one end portion of the wound body. Meanwhile, current collector 20A includes four notches 20a. By notches 20a, impregnation ability of a conductive polymer dispersion liquid and/or an electrolytic solution is less likely to be decline. Current collector 20A can connect a part of a non-facing portion of the outermost periphery in one electrode foil and one lead terminal, and a part of a non-facing portion of the innermost periphery in the one electrode foil and the one lead terminal. This shortens a moving distance of electrical charges from the outer peripheral side and the inner peripheral side of the electrode foil to the lead terminal. Current collector 20A is disposed, for example, at the bottom side of the bottomed case. Since current collector 20A can be in contact with the bottom with a large contact area, heat dissipation is likely to be improved.

Figure 3B:
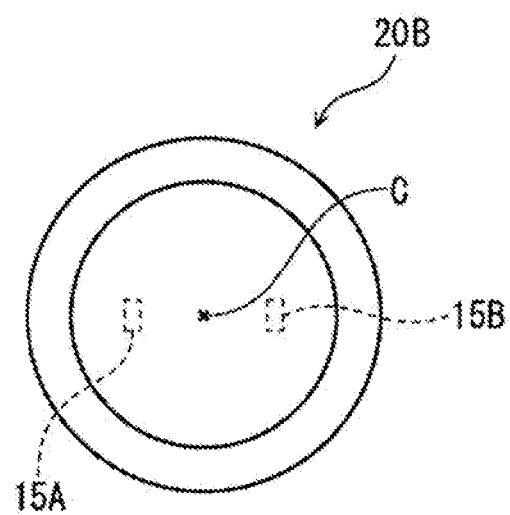
FIG. 3B is a top view schematically illustrating another example of the current collector according to the exemplary embodiment of the present disclosure.

FIG. 3B illustrates current collector 20B that is in a ring shape having an outer diameter substantially equal to a diameter of one end portion of the wound body and an inner diameter equal to or larger than a distance from center C of the one end portion to one lead terminal. Current collector 20B can connect a part of a non-facing portion of the outermost periphery in the electrode foil and a part of the non-facing portion near the lead terminal. This shortens a moving distance of electrical charges from the outer peripheral side of the electrode foil to the lead terminal. Current collector 20B can be disposed at the bottom side of the bottomed case or at a side opposite to the bottom side.

Figure 3C:
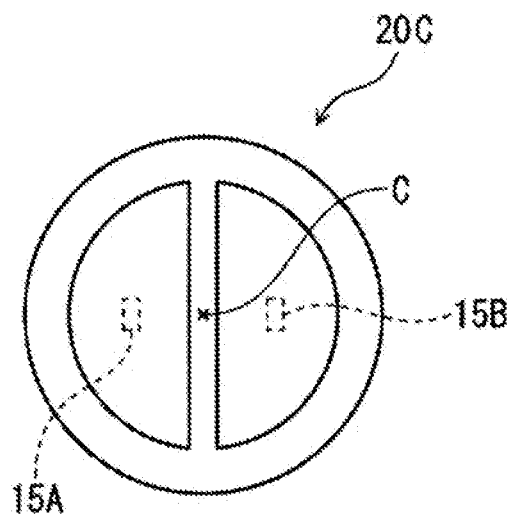
FIG. 3C is a top view schematically illustrating still another example of the current collector according to the exemplary embodiment of the present disclosure.

FIG. 3C illustrates current collector 20C that includes a ring portion as illustrated in FIG. 3B and a rectangular portion extending in a radial direction of the ring portion. The rectangular portion includes a straight line extending from center C of one end portion of the wound body to an outer edge of the one end portion in the radial direction. This shortens a moving distance of electrical charges from the outer peripheral side and the inner peripheral side of the electrode foil to the lead terminal. Since current collector 20C includes openings in portions other than the ring portion and the rectangular portion, the lead terminal and the other lead terminal can be inserted through the openings. Thus, current collector 20C is preferably disposed, for example, at the side opposite to the bottom side of the bottomed case.

Figure 3D:
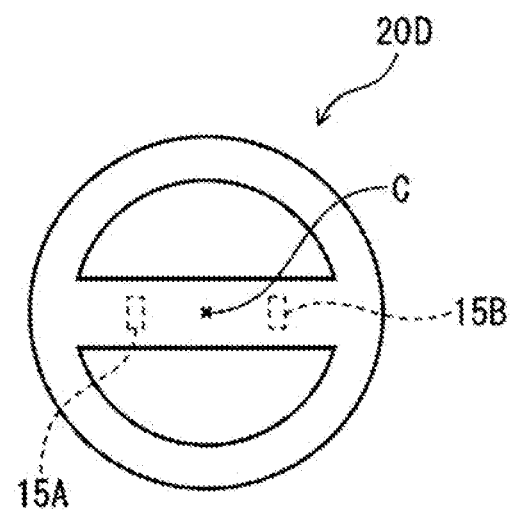
FIG. 3D is a top view schematically illustrating still another example of the current collector according to the exemplary embodiment of the present disclosure.

FIG. 3D illustrates current collector 20D that includes a ring portion and a rectangular portion as illustrated in FIG. 3C. The rectangular portion includes a straight line drawn from center C of one end portion of the wound body to the outer edge of the end portion through the center of each of the lead terminals. This further shortens a moving distance of electrical charges from the outer peripheral side and the inner peripheral side of the electrode foil to the lead terminal. Current collector 20D is disposed, for example, at the bottom side of the bottomed case.

[Method for Manufacturing Electrolytic Capacitor]

The electrolytic capacitor according to the present exemplary embodiment can be manufactured by the following method. The present exemplary embodiment includes a method for manufacturing an electrolytic capacitor.

The method for manufacturing an electrolytic capacitor according to the present exemplary embodiment includes: a step of preparing a first electrode foil connected to a first lead terminal and a second electrode foil connected a second lead terminal; a step of stacking the first electrode foil and the second electrode foil to oppose to each other so that a first non-facing portion that does not face the second electrode foil is formed in the first electrode foil; a step of winding the first electrode foil and second electrode foil to locate the first non-facing portion at a first end portion in a winding axis to obtain a capacitor element; a connecting step of connecting the first current collector to the first non-facing portion so that the first current collector is located in a vicinity of the first end portion; and a step of housing the capacitor element in a case.

Figure 4:
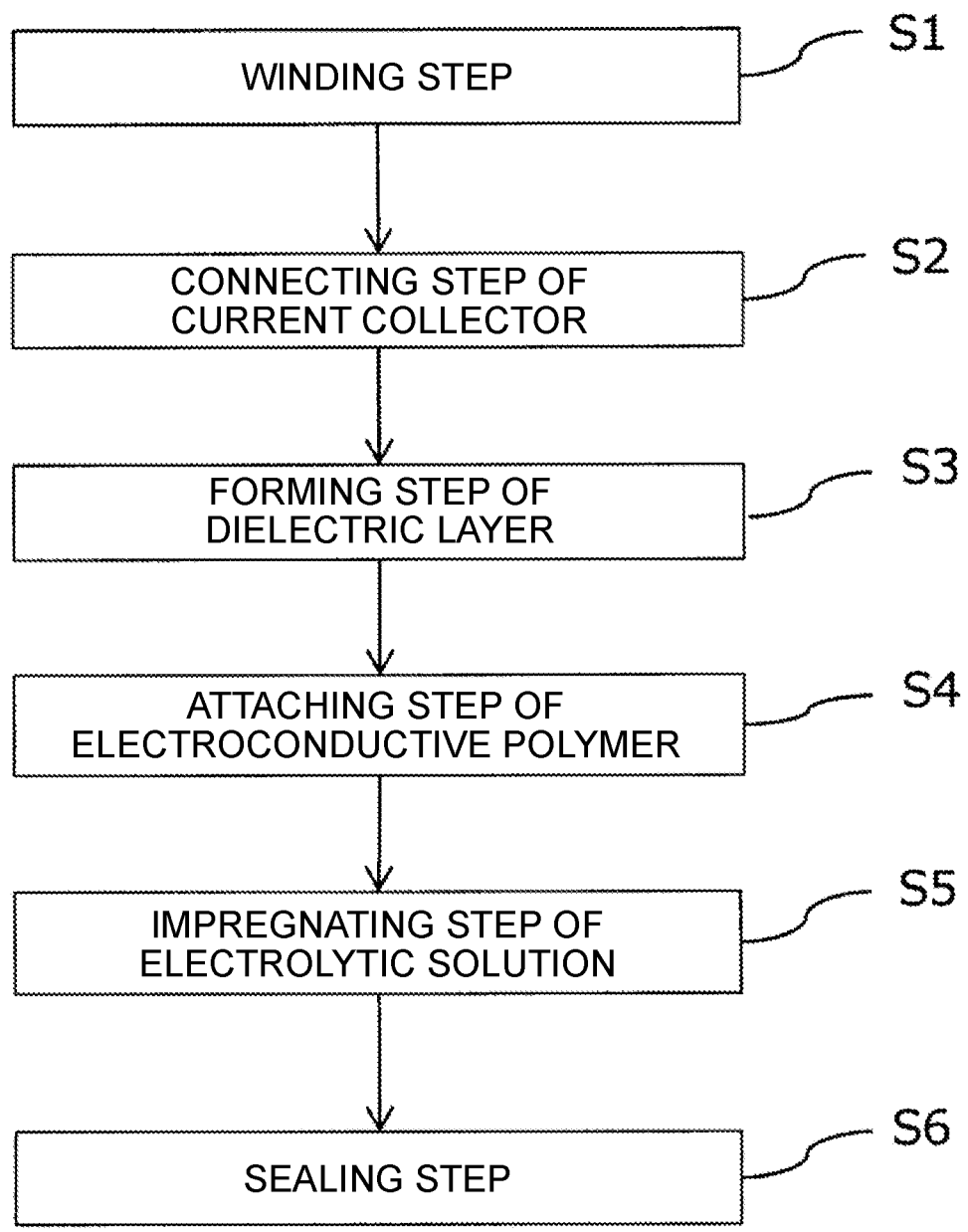
FIG. 4 is a flowchart showing an example of a manufacturing method according to the exemplary embodiment of the present disclosure.

FIG. 4 is a flowchart illustrating an example of the method for manufacturing an electrolytic capacitor according to the present exemplary embodiment.

(1) Winding Step (S1)

The first electrode foil and the second electrode foil are stacked and wound to produce a capacitor element.

Before the winding step, the first lead terminal is connected to the first electrode foil. Similarly, the second lead terminal is connected to the second electrode foil. The electrode foil and the lead terminal are connected by welding such as laser welding, for example. Each lead terminal can be connected at any position, and may be connected at a position appropriately set in consideration of a length of the electrode foil in the winding direction, for example. On a surface of electrode foil corresponding to the anode foil, a dielectric layer is formed.

The first electrode foil and the second electrode foil are opposed to each other such that the first non-facing portion that does not face the second electrode foil is formed in an end portion along a winding direction of the first electrode foil, and then are wound. In this way, the first non-facing portion protrudes from the first end portion in the winding axis of the wound body.

The first non-facing portion is not particularly limited in size, shape, and the like, and may be appropriately defined in consideration of size, shape, and the like of the first current collector. The first non-facing portion has length L1$a$ in a lateral direction (a direction along the winding axis) of the first electrode foil. Further, length L1$a$ may be, for example, 10% or more, or 25% or more of length L1 of the first electrode foil in the lateral direction. Length L1$a$ may be 50% or less, 40% or less, or 30% or less of length L1. Length L1$a$ is an average length measured at any three portions in the first non-facing portion of the first electrode foil.

The first non-facing portion may be formed in the entirety of the end portion along the winding direction of the first electrode foil, or may be formed in a part of the end portion. In the latter case, the first non-facing portion is formed to extend from one or more portions in the end portion toward the first end portion.

The first electrode foil and the second electrode foil may be wound such that a second non-facing portion is further formed in addition to the first non-facing portion. In this case, the second non-facing portion protrudes from a second end portion of the wound body.

The second non-facing portion may be similar in size to the first non-facing portion. That is, the second non-facing portion has length L2$a$ in a lateral direction (the direction along winding axis) of the second electrode foil. Further, length L2$a$ may be, for example, 10% or more, or 25% or more of length L2 of the second electrode foil in the lateral direction. Length L2$a$ may be 50% or less, 40% or less, or 30% or less of length L2. Length L2$a$ is an average length measured at any three portions in the second non-facing portion of the second electrode foil.

The second non-facing portion may be similar in shape to the first non-facing portion. That is, the second non-facing portion may be formed in the entirety of the end portion along the winding direction of the second electrode foil, or may be formed extending from a part of the end portion.

A separator may be interposed between the first electrode foil and the second electrode foil. In this case, the outermost layer of the wound body is, for example, the separator. After winding, an end portion of the separator is fixed with a fastening tape.

Figure 5:
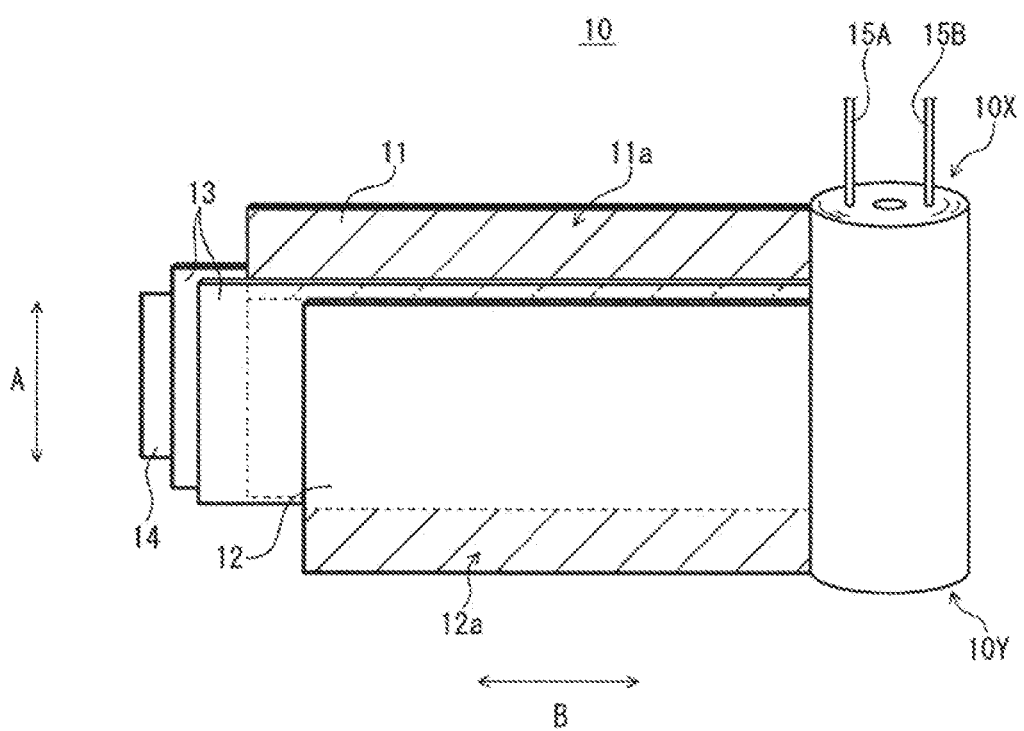
FIG. 5 is a perspective view schematically illustrating a capacitor element in a winding step of the manufacturing method according to the exemplary embodiment of the present disclosure.

FIG. 5 is a perspective view schematically illustrating the capacitor element in the winding step. For convenience, the first non-facing portion and the second non-facing portion are hatched.

Anode foil 11 and cathode foil 12 are stacked such that first non-facing portion 11*a* is formed in the entirety of an end portion of anode foil 11 in winding direction B, and second non-facing portion 12*a* is formed in the entirety of an end portion of cathode foil 12 in winding direction B. Separator 13 is interposed between anode foil 11 and cathode foil 12. The outermost periphery of wound body 10 is separator 13, and an end portion of separator 13 is fixed with fastening tape 14.

Figure 6:
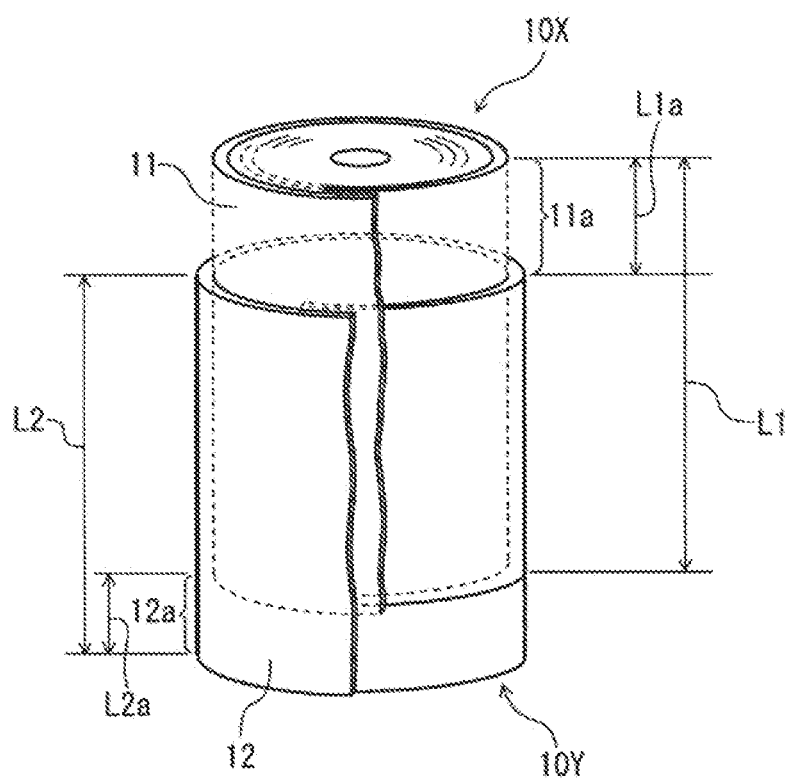
FIG. 6 is a perspective view schematically illustrating a part of the capacitor element after the winding step of the manufacturing method according to the exemplary embodiment of the present disclosure.

FIG. 6 is a perspective view schematically illustrating a part of the capacitor element after the winding step. For convenience, the lead terminal and the separator are not illustrated.

Anode foil 11 includes first non-facing portion 11*a* that protrudes from cathode foil 12 at a side close to first end portion 10X. Cathode foil 12 includes second non-facing portion 12*a* that protrudes from anode foil 11 at a side close to second end portion 10Y. First non-facing portion 11*a* has length L1$a$ in the lateral direction of anode foil 11, and length L1$a$ is preferably 10% or more and 30% or less of length L1 of anode foil 11 in the lateral direction. Second non-facing portion 12*a* has length L2$a$ in the lateral direction of cathode foil 12, and length L2$a$ is preferably 10% or more and 30% or less of length L2 of cathode foil 12 in the lateral direction.

(2) Connecting Step (S2)

The first current collector is connected to the first non-facing portion. At this time, the first current collector is disposed in a vicinity of the first end portion. When the second non-facing portion is formed, the second current collector is connected to the second non-facing portion in this step, and the second current collector is disposed in a vicinity of the second end portion.

The electrode foil and the current collector are connected by welding such as laser welding, for example. For example, the laser is irradiated, from a side opposite to the wound body, to a plurality of places of the current collector which are located radially.

Figure 7:
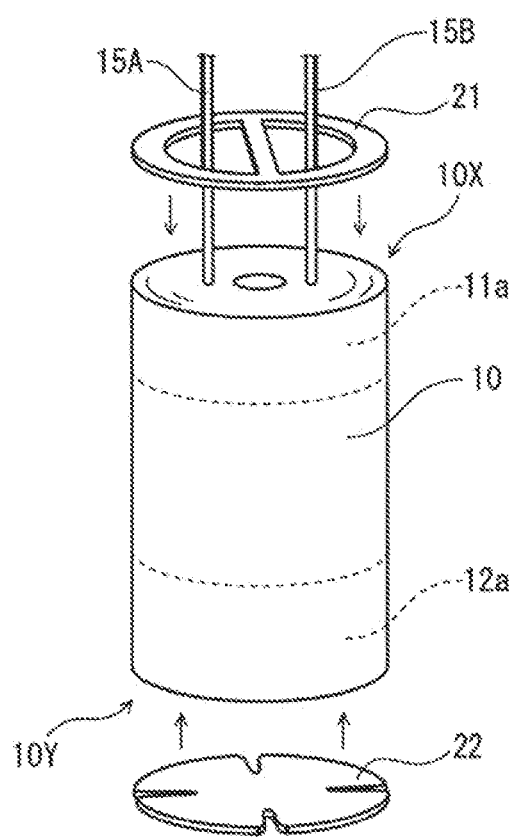
FIG. 7 is a perspective view schematically illustrating the capacitor element and the current collector in a connecting step of the manufacturing method according to the exemplary embodiment of the present disclosure.

FIG. 7 is a perspective view schematically illustrating the capacitor element and the current collector in the connecting step. First current collector 21 is placed on first end portion 10X and welded to first non-facing portion 11a. Second current collector 22 is placed on second end portion 10Y and welded to second non-facing portion 12a. First current collector 21 has a shape as illustrated in FIG. 3C, and first lead terminal 15A and second lead terminal 15B are inserted into two respective openings. Second current collector 22 has a shape as illustrated in FIG. 3A, and four notches 20a are formed.

(3) Forming Step of Dielectric Layer (S3)

After the connecting step, a forming step of forming a dielectric layer on the first current collector may be performed. By the formation of the dielectric layer, corrosion of the first current collector can be easily suppressed. Additionally, the dielectric layer can be formed again on the anode foil.

Although a method for forming the dielectric layer is not specifically limited, the dielectric layer can be formed by performing anodizing treatment on the first current collector. For example, the anodizing treatment causes a capacitor element to be immersed in an anodizing solution such as an ammonium adipate solution, ammonium phosphate, or ammonium borate, and to be subjected to heat treatment. Alternatively, voltage may be applied to the capacitor element immersed in the anodizing solution.

(4) Attaching Step of Conductive Polymer (S4)

After the forming step of a dielectric layer, a conductive polymer may be attached to the capacitor element as necessary. The conductive polymer can be attached to the capacitor element by performing chemical polymerization and/or electrolytic polymerization of its raw material monomer on the capacitor element. Alternatively, the conductive polymer may be attached to the capacitor element by impregnating the capacitor element with a conductive polymer dispersion liquid containing the conductive polymer and a dispersion medium or a conductive polymer solution. When the conductive polymer is attached to the capacitor element by impregnating the capacitor element with the conductive polymer dispersion liquid or the conductive polymer solution, residues such as an oxidant during polymerization can be reduced. Thus, corrosion of each current collector and a joint portion between each current collector and electrode foil is likely to be suppressed.

The conductive polymer is interposed between the first electrode foil and the second electrode foil, and is also attached to the first current collector and the second current collector. This enhances electrical conductivity between each current collector and the electrode foil, so that reduction of ESR can be further expected.

(Conductive Polymer Dispersion Liquid)

The conductive polymer dispersion liquid contains the conductive polymer and the dispersion medium. The conductive polymer dispersion liquid may further contain the dopant described above.

The conductive polymer is dispersed in the dispersion medium, for example, in the form of particles. The particles of the conductive polymer have a mean particle diameter that is not particularly limited, and that can be appropriately adjusted by, for example, polymerization conditions and dispersion conditions. For example, the mean particle diameter of the particles of the conductive polymer may range from 0.01 μm to 0.5 μm, inclusive. Here, the mean particle diameter is a median diameter in a volume particle size distribution measured by a particle diameter measuring device using dynamic light scattering.

The dispersion medium is not particularly limited, and may be water, a nonaqueous solvent, or a mixture thereof. The nonaqueous solvent is a general term for liquids other than water, and includes an organic solvent and an ionic liquid. In particular, the dispersion medium may be water from the viewpoint of handleability and dispersibility of the conductive polymer. The water may occupy 50% by mass or more, 70% by mass or more, or 90% by mass or more of the dispersion medium. Examples of the nonaqueous solvent to be used together with water include a polar solvent (a protic solvent and/or an aprotic solvent).

Examples of the protic solvent include alcohols such as methanol, ethanol, propanol, butanol, ethylene glycol (EG), propylene glycol, polyethylene glycol (PEG), diethylene glycol monobutyl ether, glycerin, 1-propanol, butanol, polyglycerin, sorbitol, mannitol, and pentaerythritol, and formaldehyde. Examples of the aprotic solvent include: amides such as N-methylacetamide, N,N-dimethylformamide, and N-methyl-2-pyrrolidone; esters such as methyl acetate and γ-butyrolactone (γBL); ketones such as methyl ethyl ketone; ethers such as 1,4-dioxane; sulfur-containing compounds such as dimethylsulfoxide and sulfolane (SL); and carbonate compounds such as propylene carbonate.

For example, the conductive polymer dispersion liquid can be obtained by a method for dispersing the conductive polymer in the dispersion medium or a method for polymerizing a precursor monomer of the conductive polymer in the dispersion medium and generating particles of the conductive polymer in the dispersion medium.

The conductive polymer may have a weight-average molecular weight within a range from 1000 to 200000, inclusive, or from 75000 to 150000, inclusive, for example.

The conductive polymer dispersion liquid may have a conductive polymer content of 0.5% by mass or more and less than 3% by mass, for example. The conductive polymer dispersion liquid preferably has a viscosity measured at room temperature (20° C.) using a vibration type viscometer, the viscosity being less than 100 mPa·s, for example.

(5) Impregnating Step of Electrolytic Solution (S5)

After the forming step of a dielectric layer, the capacitor element may be impregnated with an electrolytic solution in a first impregnating step as necessary. The capacitor element may be impregnated with the electrolytic solution without performing the first impregnating step, or may be further impregnated with the electrolytic solution after the first impregnating step. The electrolytic solution is likely to improve self-repairing performance of the dielectric layer. The electrolytic solution also functions as a substantial cathode material, so that an effect of increasing capacitance can be expected. A method for the impregnation is not particularly limited.

(Electrolytic Solution)

The electrolytic solution contains a solvent. Examples of the solvent include a sulfone compound, a lactone compound, a carbonate compound, and a polyhydric alcohol. Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate (DMC), diethyl carbonate (DEC), ethylmethyl carbonate (EMC), ethylene carbonate (EC), propylene carbonate (PC), and fluoroethylene carbonate (FEC). Examples of the polyhydric alcohol include: glycol compounds such as ethylene glycol (EG), diethylene glycol, triethylene glycol, propylene glycol, and polyethylene glycol (PEG); and glycerin. These compounds may be used alone or in combination of a plurality of types of compound.

In particular, the solvent may contain a compound having two or more hydroxy groups. Examples of such a compound include a polyhydric alcohol. The solvent may contain the compound having two or more hydroxy groups with a content of 50% by mass or more, 60% by mass or more, or 70% by mass or more.

The electrolytic solution may further contain an acid component. When the conductive polymer and the dopant are attached to the electrolytic capacitor, the acid component in the electrolytic solution suppresses a dedoping phenomenon of the dopant and stabilizes conductivity of the conductive polymer. Even when the dopant desorbs from the conductive polymer, a site with a trace of the dopant having desorbed is doped again with the acid component of the electrolytic solution, and thus the ESR is likely to be maintained low.

The acid component in the electrolytic solution desirably produces an anion that does not excessively increase viscosity of the electrolytic solution, and that easily dissociates in the electrolytic solution and easily moves in the solvent. Examples of such an acid component include aliphatic sulfonic acid having 1 to 30 carbon numbers and aromatic sulfonic acid having 6 to 30 carbon numbers. As the aliphatic sulfonic acid, monovalent saturated aliphatic sulfonic acid (e.g., hexanesulfonic acid) is preferable. As the aromatic sulfonic acid, aromatic sulfonic acid having a hydroxy group or a carboxy group in addition to a sulfo group is preferable, and specifically, oxyaromatic sulfonic acid (e.g., phenol-2-sulfonic acid) and sulfoaromatic carboxylic acid (e.g., p-sulfobenzoic acid, 3-sulfophthalic acid, 5-sulfosalicylic acid) are preferable.

Examples of other acid components include carboxylic acid. The carboxylic acid preferably contains aromatic carboxylic acid having two or more carboxyl groups (aromatic dicarboxylic acid). Examples of the aromatic carboxylic acid include phthalic acid (ortho form), isophthalic acid (meta form), terephthalic acid (para form), maleic acid, benzoic acid, salicylic acid, trimellitic acid, and pyromellitic acid. In particular, aromatic dicarboxylic acid such as phthalic acid (ortho form) or maleic acid is more preferable. The carboxyl group of the aromatic dicarboxylic acid is stable and is less likely to cause a side reaction to proceed. This causes an effect of stabilizing the conductive polymer to be exhibited over a long period of time, thereby being advantageous in prolonging the life of the electrolytic capacitor. The carboxylic acid may be aliphatic carboxylic acid such as adipic acid.

The acid component may contain a composite compound of organic acid and inorganic acid in terms of thermal stability. Examples of the composite compound of organic acid and inorganic acid include borodisalicylic acid, borodioxalic acid, and borodiglycolic acid that have high heat resistance.

The acid component may include inorganic acid such as boric acid, phosphoric acid, phosphorous acid, hypophosphorous acid, or phosphonic acid.

From the viewpoint of enhancing an effect of suppressing the dedoping phenomenon, the acid component may have a concentration within a range from 5% by mass to 50% by mass, inclusive, or from 15% by mass to 35% by mass, inclusive.

The electrolytic solution may contain a base component together with an acid component. At least a part of the acid component is neutralized by the base component. This enables corrosion of an electrode due to the acid component to be suppressed while the acid component is increased in concentration. From the viewpoint of effectively suppressing dedoping, the acid component is preferably more excessive than the base component in terms of equivalent ratio. For example, the equivalent ratio of the acid component to the base component may range from 1 to 30, inclusive. The concentration of the base component contained in the electrolytic solution may range from 0.1% by mass to 20% by mass, inclusive, or from 3% by mass to 10% by mass, inclusive.

The base component is not particularly limited. Examples of the base component include ammonia, primary amine, secondary amine, tertiary amine, a quaternary ammonium compound, and an amidinium compound. Examples of each amine include aliphatic amine, aromatic amine, and heterocyclic amine.

The electrolytic solution has a pH of preferably less than or equal to 4, more preferably less than or equal to 3.8, further preferably less than or equal to 3.6. When the electrolytic solution has a pH of 4 or less, deterioration of the conductive polymer is further suppressed. The pH is preferably 2.0 or more.

(6) Sealing Step (S6)

The produced capacitor element is housed in a bottomed case. At this time, the first end portion or the second end portion of the capacitor element faces the bottom of the bottomed case. When the current collector is disposed at the bottom side of the bottomed case, the bottom and the current collector may be brought into contact with each other as necessary.

Subsequently, the bottomed case is laterally squeezed at near its opening end to curl the opening end to crimp sealing member, thereby sealing the capacitor element. Finally, a base plate is disposed on a curled portion to complete the electrolytic capacitor. Thereafter, an aging treatment may be performed while a rated voltage is applied.

The electrolytic capacitor may have at least one capacitor element, and may have a plurality of capacitor elements. A number of capacitor elements included in the electrolytic capacitor may be determined according to application.

EXAMPLES

Hereinafter, the present disclosure is described in more detail based on examples. The present disclosure, however, is not to be limited to the examples.

Example 1

An electrolytic capacitor having a rated voltage of 35V was produced in the following manner.

(a) Preparation of Electrode Foil and Separator

Etching treatment was performed on aluminum foil having a thickness of 100 μm to roughen a surface of the aluminum foil. The roughened surface of the aluminum foil was subjected to anodizing treatment to form a dielectric layer, thereby obtaining anode foil. Etching treatment was performed on aluminum foil having a thickness of 50 μm to roughen a surface of the aluminum foil, thereby obtaining cathode foil. A cellulose nonwoven fabric having a thickness of 50 μm was prepared as a raw material of a separator.

(b) Production of Capacitor Element

The anode foil, cathode foil, and the separator were cut. The anode foil had length L1 of 9 mm in its lateral direction, and the cathode foil had length L2 of 12 mm in its lateral direction. The separator had a size enough to cover at least a portion where the anode foil and the cathode foil faced each other.

The anode foil and the cathode foil were each connected to a lead terminal, and then were stacked with the separator interposed therebetween to protrude the cathode foil from one side of the anode foil along a winding direction. The cathode foil had a non-facing portion having length L1$a$ of 3 mm in its lateral direction, and the separator had a portion protruding from the anode foil, the portion having a length of 1.5 mm in its lateral direction. Then, the anode foil and the cathode foil were wound with the separator interposed therebetween while each lead terminal was wound. The separator on the outermost periphery of a wound body was fixed at its end portion with a fastening tape to obtain a capacitor element. The lead terminal of each foil was drawn out from the capacitor element on a side opposite to a side on which the cathode foil protruded.

(c) Connection of Current Collector

Aluminum foil having a thickness of 100 μm was cut to prepare a current collector having a shape as illustrated in FIG. 3A. The current collector was welded to a non-facing portion of the cathode foil by laser welding.

(d) Formation of Dielectric Layer

The capacitor element connected to the current collector was subjected to anodizing treatment to form a dielectric layer on a cutting surface of the anode foil and a surface of the current collector.

(e) Preparation and Impregnation of Conductive Polymer Dispersion Liquid

A mixed solution was prepared by dissolving 3,4-ethylenedioxythiophene and polystyrenesulfonic acid (PSS, weight-average molecular weight of 100000) in ion-exchanged water. While the mixed solution was stirred, iron (III) sulfate (oxidant) was added to the mixed solution to cause a polymerization reaction. Subsequently, the reaction solution was dialyzed to remove an unreacted monomer and oxidant, so that a conductive polymer dispersion liquid containing polyethylene dioxythiophene (PEDOT/PSS) doped with about 5% by mass of PSS (dopant) was obtained. A concentration of the conductive polymer in the conductive polymer dispersion liquid was 1.5% by mass. The conductive polymer dispersion liquid had a viscosity of 30 mPa·s which was measured under conditions of room temperature (20° C.) using a vibration type viscometer (VM-100A available from SECONIC CORPORATION).

The capacitor element connected to the current collector was immersed in the conductive polymer dispersion liquid in a reduced-pressure atmosphere (40 kPa) for 5 minutes, and then subjected to drying treatment to attach the conductive polymer to the capacitor element.

(f) Impregnation with Electrolytic Solution

Ethylene glycol (EG) was prepared as a solvent. An electrolytic solution was prepared by dissolving 5-sulfosalicylic acid (divalent acid component) as second sulfonic acid and triethylamine as the base component in the EG at a total concentration of 25% by mass. An equivalent ratio of the 5-sulfosalicylic acid to the triethylamine was 2.0.

After the impregnation (e) with the conductive polymer dispersion liquid, the capacitor element connected to the current collector was immersed in the electrolytic solution in a reduced-pressure atmosphere (40 kPa) for 5 minutes.

(g) Sealing of Capacitor Element

The capacitor element that had been impregnated with the electrolytic solution was sealed to complete electrolytic capacitor (A1) illustrated in FIG. 2. Then, aging was performed at 95° C. for 90 minutes while rated voltage Vw is applied.

<Evaluation>

Electrolytic capacitor A1 was measured for ESR at a measurement temperature of 20° C. Evaluation results are shown as relative values to ESR of electrolytic capacitor B1 prepared in Comparative Example 1.

Example 2

Production (b) of a capacitor element was performed by: allowing anode foil to have a length of 12 mm in its lateral direction and cathode foil to have a length of 9 mm in its lateral direction; cutting a separator to have a size enough to cover at least facing portions of the anode foil and the cathode foil; and stacking the anode foil and the cathode foil with the separator interposed therebetween to protrude the anode foil and the separator from one side of the cathode foil along its winding direction. Connection (c) of the current collector was performed by: cutting aluminum foil having a thickness of 100 μm to prepare a current collector having a shape as illustrated in FIG. 3C; and welding the current collector to a non-facing portion of the anode foil by laser welding.

Except for the above, electrolytic capacitor A2 was produced and evaluated in the same manner as in Example 1. Table 1 shows results. The anode foil had a non-facing portion having a length of 3 mm in its lateral direction, and the separator had a portion protruding from the cathode foil, the portion having a length of 1.5 mm in its lateral direction.

Example 3

Production (b) of a capacitor element was performed by: allowing anode foil to have a length of 12 mm in its lateral direction and cathode foil to have a length of 12 mm in its lateral direction; cutting a separator to have a size enough to cover facing portions of the anode foil and the cathode foil; and stacking the anode foil and the cathode foil with the separator interposed therebetween not only to protrude the cathode foil and the separator from one side of the anode foil along its winding direction, but also to protrude the anode foil and the separator from one side of the cathode foil along its winding direction. Connection (c) of the current collector was performed by: cutting aluminum foil having a thickness of 100 μm to prepare a current collector having a shape as illustrated in FIG. 3A and a current collector having a shape as illustrated in FIG. 3C; and welding the current collectors to corresponding non-facing portions of the cathode foil and the anode foil by laser welding as illustrated in FIG. 7.

Except for the above, electrolytic capacitor A3 was produced and evaluated in the same manner as in Example 1.

Table 1 shows results. The anode foil had a non-facing portion having a length of 3 mm in its lateral direction, and the cathode foil had a non-facing portion having a length of 3 mm in its lateral direction. The separator had portions protruding from the anode foil and the cathode foil, the portions each having a length of 1.5 mm in its lateral direction.

Comparative Example 1

Production (b) of a capacitor element was performed to produce and evaluate electrolytic capacitor B1 in the same manner as in Example 1 except that anode foil and cathode foil were cut into the same size (each foil had a length of 9 mm in its lateral direction) without forming a non-facing portion, and no current collector was used. Table 1 shows results.

TABLE 1

| Electrolytic capacitor | ESR |
|---|---|
| A1 | 0.78 |
| A2 | 0.82 |
| A3 | 0.30 |
| B1 | 1 |

The present disclosure can suppress increase in ESR, and thus is particularly suitable for an electrolytic capacitor in which a high ripple current flows.

What is claimed is:

1. An electrolytic capacitor comprising:
    a capacitor element including:
        a wound body in which a first electrode foil and a second electrode foil are wound, the first electrode foil and the second electrode foil facing each other;
        a first lead terminal connected to the first electrode foil; and
        a second lead terminal connected to the second electrode foil;
    a first current collector connected to the first electrode foil; and
    a case that houses the capacitor element and the first current collector, wherein:
    the first electrode foil includes a first facing portion that faces the second electrode foil and a first non-facing portion that does not face the second electrode foil, the first non-facing portion being located at a first end portion in a winding axis of the wound body,
    the first current collector is disposed in a vicinity of the first end portion of the wound body to be connected to the first non-facing portion of the first electrode foil, and
    the first current collector includes an opening, and the second lead terminal is inserted in the opening.

2. The electrolytic capacitor according to claim 1, wherein the first current collector includes metal foil including a valve metal.

3. The electrolytic capacitor according to claim 1, further comprising a second current collector connected to the second electrode foil, wherein:
    the second electrode foil includes a second facing portion that faces the first electrode foil and a second non-facing portion that does not face the first electrode foil, the second non-facing portion being located at a second end portion opposite to the first end portion in the winding axis of the wound body, and
    the second current collector is disposed in a vicinity of the second end portion of the wound body to be connected to the second non-facing portion of the second electrode foil.

4. The electrolytic capacitor according to claim 3, wherein the second current collector includes metal foil including a valve metal.

5. The electrolytic capacitor according to claim 1, wherein the first current collector electrically connects a plurality of portions in the first non-facing portion to each other, the plurality of portions being located at different distances from a center of the wound body.

6. The electrolytic capacitor according to claim 1, wherein the first electrode foil is anode foil.

7. The electrolytic capacitor according to claim 1, wherein the first electrode foil is cathode foil.

8. The electrolytic capacitor according to claim 1, further comprising a conductive polymer, wherein the conductive polymer is interposed between the first electrode foil and the second electrode foil, and is attached to the first current collector.

9. The electrolytic capacitor according to claim 1, further comprising an electrolytic solution.

10. The electrolytic capacitor according to claim 1, wherein the first current collector is a plate-like member covering at least a part of the first end portion.

11. The electrolytic capacitor according to claim 1, wherein the first lead terminal is inserted in the opening of the first current collector, and
    the first lead terminal is disposed to be away from the first current collector in the opening.

12. The electrolytic capacitor according to claim 1, wherein the first current collector includes at least one of a plurality of through-holes or a plurality of notches.

13. The electrolytic capacitor according to claim 1, wherein the first current collector includes a dielectric layer disposed on a surface of the first current collector.

14. The electrolytic capacitor according to claim 1, wherein the second lead terminal is disposed to be away from the first current collector in the opening.

* * * * *